(12) United States Patent
Brown

(10) Patent No.: US 11,779,968 B2
(45) Date of Patent: Oct. 10, 2023

(54) REMOTELY OPERATED VESSEL CLEANING APPARATUS AND METHOD

(71) Applicant: Clean Harbors Industrial Services, Inc., Norwell, MA (US)

(72) Inventor: Charles E. Brown, Hull, TX (US)

(73) Assignee: Clean Harbors Industrial Services, Inc., Norwell, MA (US)

(*) Notice: Subject to any disclaimer, the term of this patent is extended or adjusted under 35 U.S.C. 154(b) by 270 days.

(21) Appl. No.: 17/379,165

(22) Filed: Jul. 19, 2021

(65) Prior Publication Data

US 2023/0019349 A1   Jan. 19, 2023

(51) Int. Cl.
| | |
|---|---|
| B08B 9/093 | (2006.01) |
| B25J 5/00 | (2006.01) |
| B25J 19/00 | (2006.01) |
| B25J 11/00 | (2006.01) |

(52) U.S. Cl.
CPC ............... B08B 9/093 (2013.01); B25J 5/005 (2013.01); B25J 11/0085 (2013.01); B25J 19/0025 (2013.01); *B08B 2209/08* (2013.01)

(58) Field of Classification Search
CPC ........................................................ B08B 9/093
See application file for complete search history.

(56) References Cited

U.S. PATENT DOCUMENTS

| | | |
|---|---|---|
| 7,971,497 B2 | 7/2011 | Gershtein et al. |
| 2015/0122293 A1 | 5/2015 | DesOrmeaux |

FOREIGN PATENT DOCUMENTS

| | | |
|---|---|---|
| CN | 201692966 U | 1/2011 |
| CN | 103949446 A | 7/2014 |
| CN | 205949433 U | 2/2017 |
| CN | 208116248 U | 11/2018 |
| KR | 1020130011279 A | 1/2013 |

*Primary Examiner* — Jason Y Ko
(74) *Attorney, Agent, or Firm* — Richard L. Sampson; Davis, Malm, D'Agostine, P.C.

(57) ABSTRACT

A vessel cleaning device and method includes an armored chassis with track members operable independently by first and second pneumatic drive systems, and a remotely controllable arm. A plurality of nozzles disposed on the arm are configured to rotate while spraying high pressure liquid in mutually opposed directions when the arm is extended. The device is sized and shaped to pass through a 24-inch opening in the vessel when the arm is collapsed, and the track members and the arm are controllable remotely by an operator external to the vessel. Once the device has passed through the 24-inch opening into the vessel, the arm is movable into the extended position, and the device is movable within the vessel while the nozzles spray liquid along a notional circumference to remove waste materials from an interior surface of the vessel.

25 Claims, 3 Drawing Sheets

REMOTELY OPERATED VESSEL CLEANING APPARATUS AND METHOD

BACKGROUND

Technical Field

This invention relates to methods and apparatuses for the removal materials from tanks or vessels, and more particularly to devices and methods for removing solids and sludge from the interior of a tank or other vessel.

Background Information

Conventional tank cleaning is often a long, labor-intensive, and potentially hazardous task. Conventional methods of tank and vessel cleaning often require human exposure to dangerous environments, such when cleaning vessels used for storing or transporting petrochemicals and the like.

Most currently available remote tank cleaning systems and associated methods include one or more nozzles configured to direct a fluid stream to dislodge, dilute, or dissolve settled solids from tank interiors. Generally, the purpose of these systems is to "fluidize" the settled solids and/or sludge to an extent that it can be easily pumped out. However, in some instances, settled solids and/or sludge inside tanks or other vessels cannot be removed, dissolved, or otherwise "fluidized" by the aforementioned conventionally available systems due to the composition of the solids and/or conditions inside the tank, e.g., in combination with limited available pressure of the fluid stream. In such situations, the solids and/or sludge must be physically/mechanically removed from the tank interior. Such methods may be time-consuming and may require one or more workers to physically enter the tank or vessel to mechanically dislodge the solids/sludge—a process that may place such workers in a dangerous and/or toxic environment and therefore at greater risk of exposure to health hazards and injuries. Even existing remote cleaning systems typically require humans to enter a tank to set-up, change and/or remove the system. Furthermore, depending on the material needing removal, multiple tools and systems may be required, forcing the work to be stopped and restarted while the equipment is changed out, and generally complicating the process. Additionally, often times the cleaning equipment is too large to fit through the vessel's access point, requiring further operator exposure inside of the vessel in order to assemble the equipment parts.

Therefore, there is a long-felt, but unmet, need for a remote and/or automated apparatus and method for the removal of materials, including settled solids and/or sludge, from a tank interior in order to increase the efficiency of such removal and to help protect human workers from health risks and injuries.

SUMMARY

In particular embodiments of the present invention, a device and method for removing material from a vessel includes a chassis with first and second track members, and an intrinsically safe drive system to drive the first and second track members independently of one another to provide forward, reverse and/or rotational movement of the device. A remotely controllable arm on the upper side of the chassis is pivotable between collapsed and extended positions and supports one or more nozzles rotatably disposed at a distal end thereof. The nozzles are configured to rotate while spraying liquid in mutually opposed directions along a notional circumference extending about the distal end of the arm, wherein torque on the chassis generated by the spraying liquid is substantially offset. The device is sized and shaped to pass through a 24-inch opening in a vessel when the arm is in the collapsed position. The first and second track members and the arm are controllable remotely by a control system disposable externally to the vessel, so that once the device has passed through the opening into the vessel, the arm is movable into the extended position to place the nozzles in an elevated position, and the track members are drivable to move the device while the nozzles spray liquid along the notional circumference to remove waste materials from the interior surface of the vessel.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
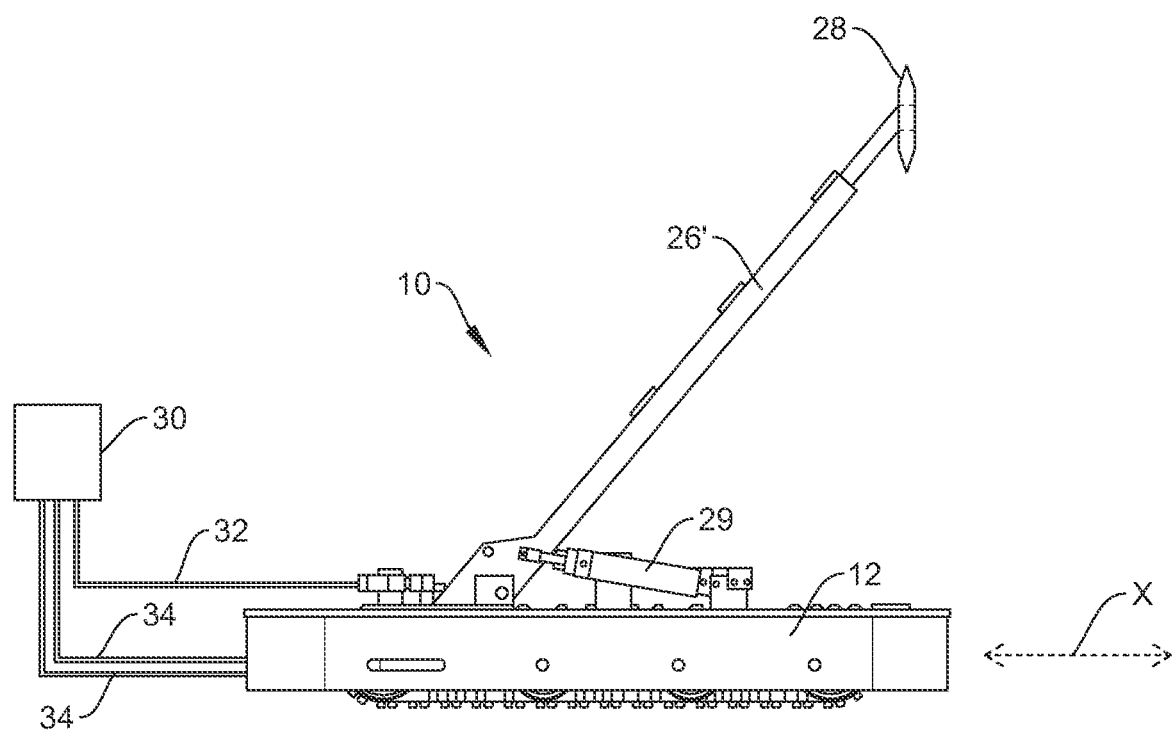
FIG. 1 is an elevational view, with portions shown schematically and with a movable arm in its extended orientation, of an embodiment of the invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "a drive system" includes a plurality of such drive systems.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

General Overview

A method and apparatus for cleaning interior surfaces of vessels includes a remotely controlled device sized and shaped for passing through a standard 24-inch opening in the top of a railroad tank car. In particular embodiments, the device includes one or more spray nozzles at the end of a remotely controllable boom/arm, and once the device has been placed onto the floor of the tank, the boom/arm is raised to place the nozzles in spaced relation to the floor of the tank, e.g., near the vertical center of the tank. Treads on the device are then operated to move the device back and forth along the length of the tank while high pressure fluid, e.g., a mixture of cleaning fluid and air, is sprayed from the nozzle(s) to liquefy and remove sludge and hardened waste materials from the interior surfaces of the tank. It is noted that the nozzle(s) are configured to rotate while spraying liquid in two or more opposed directions along a notional circumference extending about a distal end of the remotely controllable arm, so that reaction forces of the sprays acting on the raised arm substantially offset one another. Advantageously, this configuration, including the mutually opposed spray directions, permits the nozzles to be raised to a relatively high elevation from the floor of the tank while spraying at relatively high pressures, without the need to widen the chassis or to otherwise brace the device to prevent the reaction forces of the high pressure sprays from tipping the device over during operation.

In particular embodiments, the device moves using tracks driven by an intrinsically safe drive system suitable for use in hazardous or non-hazardous locations. In the embodiment shown, the intrinsically safe drive system takes the form of dual independent pneumatic or hydraulic drive systems configured to drive the left and right tracks independently for forward, reverse, or rotational movement of the device. A similar intrinsically safe actuator is used to manipulate the remotely controllable arm. In these embodiments, the device may use various conventional 2D/3D high-pressure high-volume straight tip nozzles, e.g., capable of spraying at up to 60,000 psi and a volume of 200 gpm. The device may thus be armored to withstand the impact of such high-pressure high-volume spray.

These embodiments thus provide relatively high pressure and high volume spray at an elevated position, using a relatively small device capable of fitting through standard vessel openings. Moreover, this capability is provided without the need to manipulate (e.g., aim) the nozzle(s) as is required with conventional devices that use canon style armatures. The present invention is thus capable of providing a high level of cleaning capability without the need for personnel to enter the tank.

Terminology

Where used in this disclosure, the term "axial" or "longitudinal" when used in connection with an element described herein, refers to a direction relative to the element, which is substantially parallel to axis x as shown in FIG. 1. Similarly, the term "transverse" refers to a direction other than substantially parallel to the longitudinal direction. The terms "upperside" and "underside" refer to directions relative to chassis 12 with tracks 14, 16 in a typical ground engaging orientation as shown and described herein. These terms should be construed to refer to the same portions of the chassis 12 even in the event the chassis is disposed in other orientations.

Figure 2:
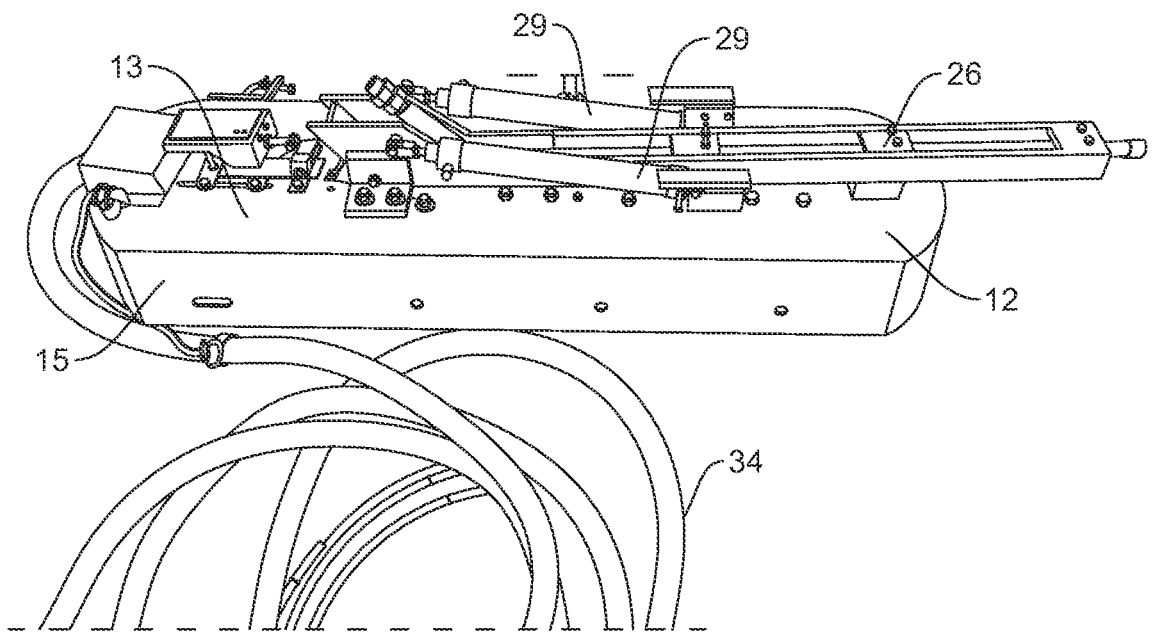
FIG. 2 is a perspective top view of portions of the embodiment of FIG. 1, with the movable arm in its collapsed orientation.
Figure 3:
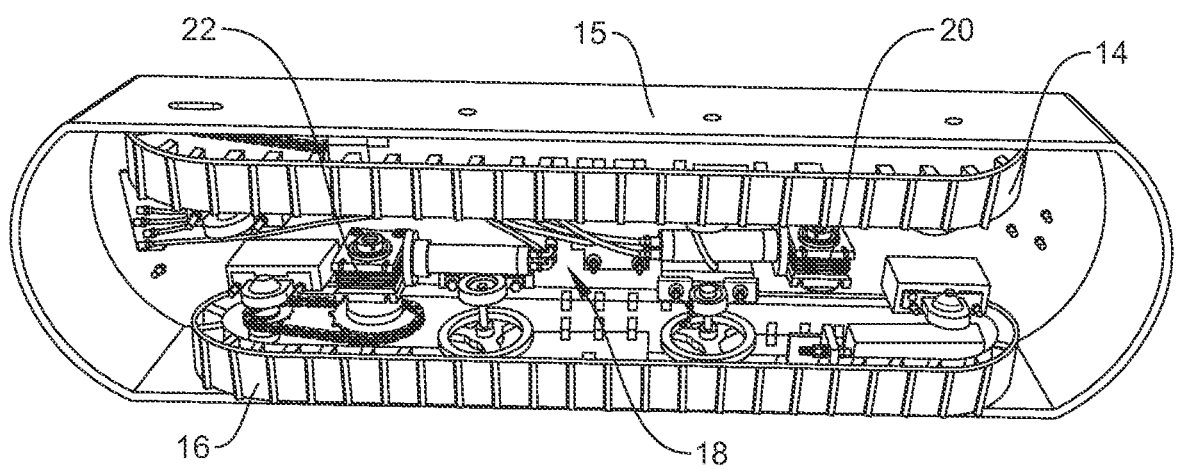
FIG. 3 is a perspective bottom view of portions of the embodiment of FIGS. 1 and 2.

Referring now to the attached Figures, embodiments of the present invention will be more thoroughly described. Turning to FIGS. 1-3, a device 10 for removing material from a vessel (not shown), includes an elongated chassis 12 that extends along a longitudinal axis x. In particular embodiments, chassis 12 is armored to withstand high pressure liquid impact on an upperside thereof, e.g., at pressures of up to 60,000 psi at a volume of 200 gpm (gallons per minute). For example, the chassis 12 may include an upperside armor plate 13 and an armored skirt 15 depending therefrom, the armored skirt 15 extending along a periphery of plate 13. As shown and described hereinbelow, the plate 13 is configured to protect device 10 from direct impact of spray from nozzle(s) 28, while the skirt 15 protects device 10 from impacts from cleaning fluid and/or debris ricocheting off the interior surfaces of the vessel.

As best shown in FIG. 3, first and second track members 14, 16 extend longitudinally on an underside of the chassis, in transversely spaced relation to one another. As also shown, an intrinsically safe drive system 18 is configured to drive the first and second track members 14, 16 independently of one another to provide forward, reverse and/or rotational movement of the device 10. Intrinsically safe actuators 29 are also used to pivot the remotely controllable arm between collapsed and extended positions 26, 26' as discussed hereinbelow. As used herein, the term 'intrinsically safe' refers to an apparatus in which any spark or thermal effect generated thereby is incapable of causing ignition of a mixture of flammable or combustible material in air under prescribed test conditions as described in ANSI/UL 913 Edition 8. Although embodiments of the present invention may use any number of intrinsically safe drive systems/actuators, in the embodiments shown, the intrinsically safe drive system 18 is pneumatic and includes a first and second pneumatic drives 20, 22 configured to respectively drive the first and second track members 14, 16. The pneumatic drives 20, 22 are configured to drive the track members 14, 16 independently of one another to provide forward, reverse and/or rotational movement of the device 10. In these embodiments, intrinsically safe actuator 29 may take the form of pneumatic cylinders as shown.

As best shown in FIGS. 1 and 2, the remotely controllable arm is pivotably disposed at a proximal end thereof on the upper side of the chassis 12. The arm is pivotable between a collapsed position extending substantially parallel to the longitudinal axis x, as shown at 26 in FIG. 2, and an extended position extending obliquely or substantially orthogonally to the longitudinal axis x, as shown at 26' in FIG. 1. In particular embodiments, intrinsically safe actuators 29 pivot the arm between collapsed and extended positions 26, 26'. One or more nozzles 28, shown schematically in FIG. 1, are rotatably disposed at a distal end of the remotely controllable arm, and are configured to rotate while spraying fluid in mutually opposed directions along a notional circumference 40 (FIGS. 4-6) extending about the distal end of the remotely controllable arm. As will be shown and described hereinbelow with respect to FIGS. 4-6, the forces generated by the mutually opposed directions of spray from the nozzles tend to offset one another so that the relatively large moment arms produced by placing the nozzles at the end of the arm 26' won't tend to upset and tip over the device 10 during operation. Indeed, in particular embodiments, device 10 is provided with a relatively narrow transverse dimension, being sized and shaped to pass through an opening as small as 24 inches, and/or as small as 20 inches in particular embodiments, when the remotely controllable arm 26 is disposed in the collapsed position (FIG. 2).

As shown schematically in FIG. 1, first and second track members 14, 16, and the remotely controllable arm 26', are communicably coupled to a remote controller 30. Controller 30 is thus capable of being located externally to the vessel during operation of device 10. The skilled artisan will note, in view of the present specification, that the controller may be communicably coupled to the track members and/or arm wirelessly and/or by hard-wired connection. For example, for embodiments having an on-board reservoir of cleaning fluid, it may be desirable for controller 30 to communicate wirelessly to the device 10. In other embodiments, such as those used in applications requiring a relatively high volume of cleaning fluid, and/or those using pneumatic or hydraulic drives/actuators, device 10 may be connected, e.g., directly and/or via controller 30 as shown, to a fluid supply hose 32 that supplies cleaning fluid to nozzle(s) 28, and/or to one or more pneumatic/hydraulic lines 34 coupled to drives 20, 22 and/or cylinders 29.

Figure 4:
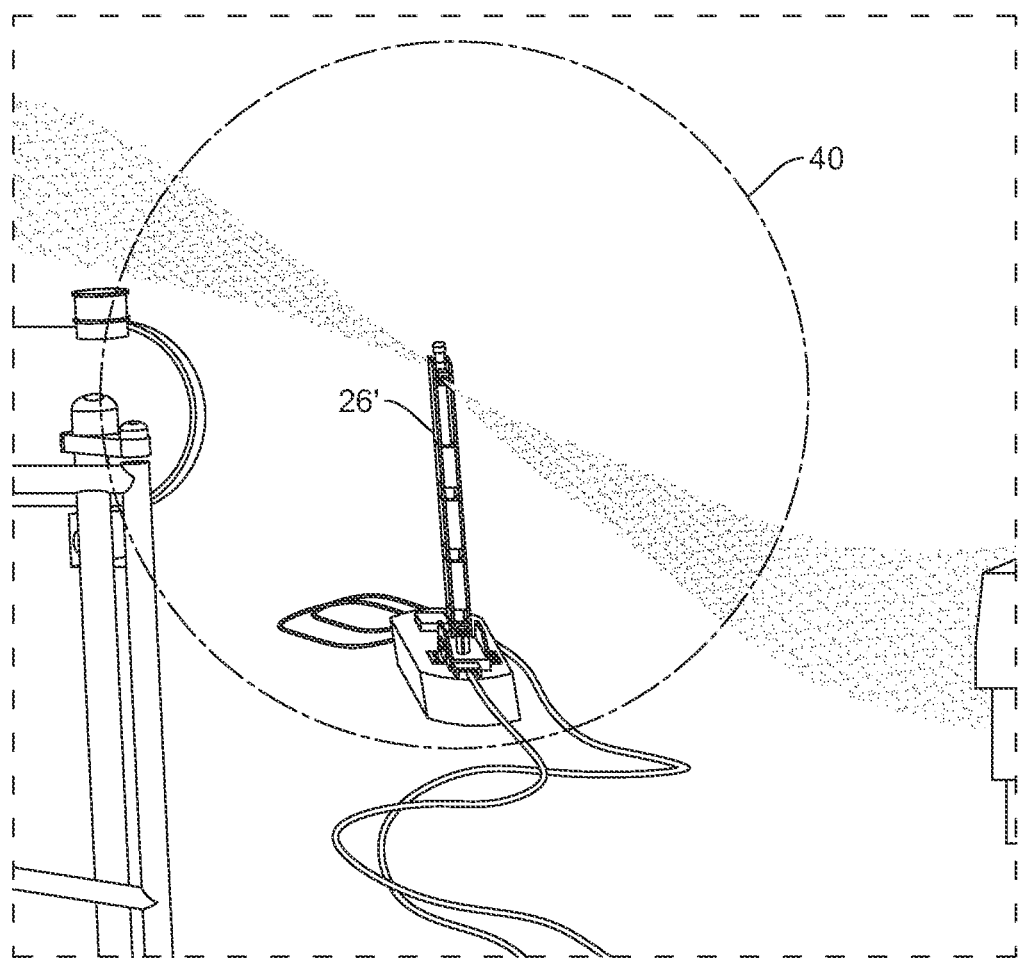
FIG. 4 is a perspective view of the embodiment of FIGS. 1-3, with the arm in its extended orientation, during a step in the operation thereof.
Figure 5:
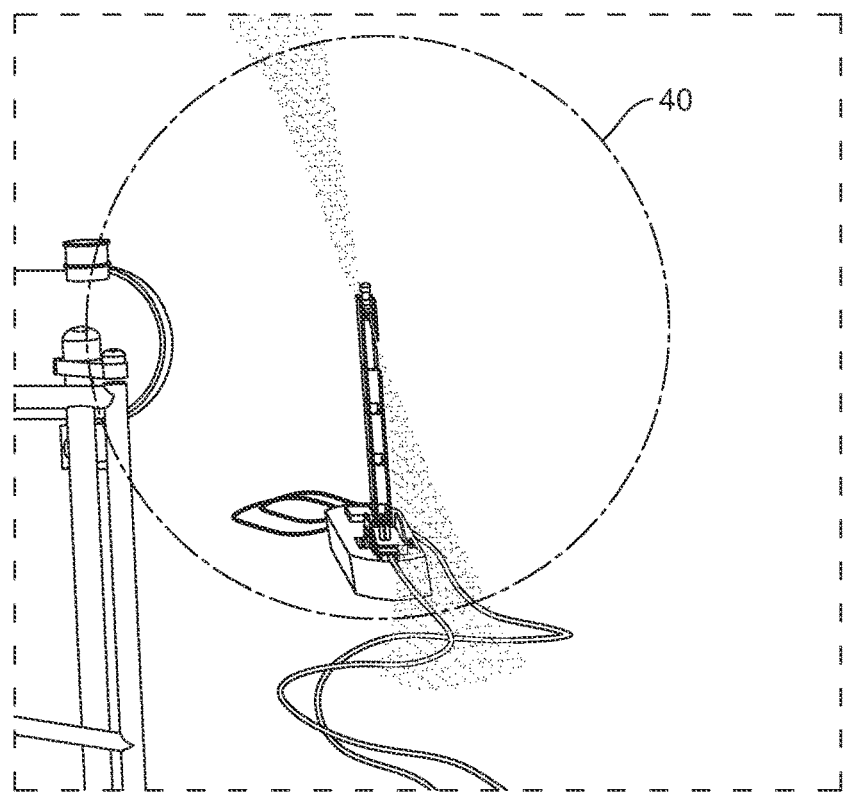
FIG. 5 is a view similar to that of FIG. 4 during another step in the operation thereof.
Figure 6:
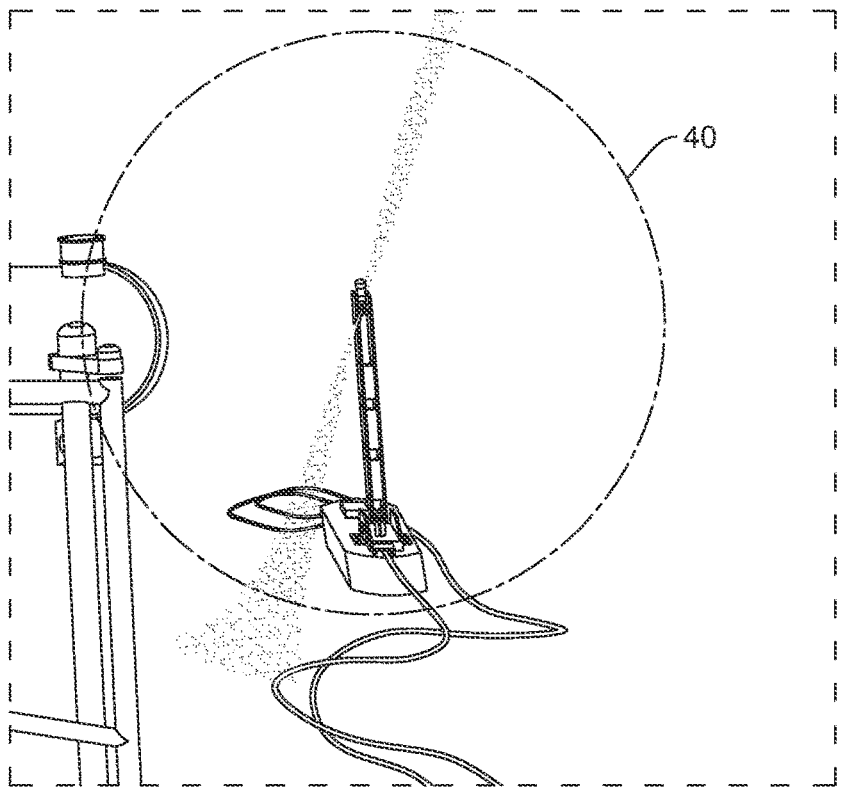
FIG. 6 is a view similar to those of FIGS. 4 and 5 during still another step in the operation thereof.

As best shown in FIGS. 4-6, in particular embodiments, nozzle(s) 28 are configured to rotate while spraying liquid at up to 60,000 psi and 200 gpm in mutually opposed directions along a notional circumference 40 extending 360 degrees about the distal end of the remotely controllable arm 26', when the arm is disposed in the extended position. As best shown in FIG. 5, the notional circumference 40 may be disposed in a plane that intersects the chassis 12, e.g., in a plane that is substantially orthogonal to the longitudinal axis x of chassis 12. It should be noted that the mutually opposed directions of the spray are spaced substantially uniformly from one another along said notional circumference, such as in diametrically opposed directions as shown. And although only two mutually opposed sprays are shown, it should be recognized that any number of sprays may be provided, as long as they are substantially evenly spaced along circumference 40, so that the reaction forces they apply to the distal end of arm 26' substantially offset one another to keep the chassis 12 balanced. For example, instead of two sprays spaced 180 degrees apart as shown, particular embodiments may use three sprays spaced 120 degrees apart, or four sprays spaced 90 degrees apart, etc.

In this regard, those skilled in the art will recognize that the reaction force of a high pressure/volume spray emitted in the transverse direction from a nozzle placed relatively high (at the end of a relatively long moment arm) above a relatively narrow chassis 12 will create a torque tending to tip the chassis over onto its side. This aspect thus tends to militate against provision of a chassis small enough to fit through relatively small openings such as the standard 24-inch openings at the top of conventional railroad tank cars. The use, however, of nozzles capable of emitting sprays in mutually force-offsetting directions, provides offsetting torque to minimize any tendency to tip over the chassis 12 despite its narrow footprint. This construction thus permits the nozzles to be raised to a relatively high elevation from the floor of the tank while spraying at relatively high pressures, without the need to widen or brace chassis 12, to provide high quality cleaning from a relatively compact device capable of passing through small openings as shown and described.

Having shown and described particular embodiments of the invention, the following is a description of an exemplary operation thereof. The foregoing embodiments may be used to remove material from the interior of a vessel, by passing chassis 12, with the remotely controllable arm in the collapsed position, through an opening of a vessel. Controller 30, disposed externally to the vessel, is used to move the remotely controllable arm, e.g., by actuating pneumatic cylinders 29 (FIG. 1), into the extended position as shown at 26', to elevate nozzles 28 within the vessel. Fluid is then supplied, e.g., by opening a valve with controller 30 to feed the fluid to the nozzles 28 via hose 32 (FIG. 1). The nozzles 28 are rotated to spray liquid in mutually opposed directions along notional circumference 40, which extends about the distal end of the remotely controllable arm 26'. As discussed hereinabove, torque generated by the spraying liquid is substantially offset to avoid tipping over the chassis 12. In particular embodiments the nozzles are rotated by the force of the water, e.g., by orienting the nozzles slightly obliquely relative to the radius of notional circumference 40. Optionally, the nozzles may be rotated mechanically, e.g., using a conventional gear train, etc., as would be familiar to those skilled in the art in light of the instant disclosure.

Controller 30 may then actuate the intrinsically safe drive system 18 to drive the first and/or second track members 14, 16 to move the device 10 within the vessel while the nozzles spray liquid along the notional circumference 40, e.g., at pressures up to 60,000 psi and at volumes of up to 200 gpm, to remove waste materials from the interior surface of the vessel. Once the vessel is clean, arm may be moved into its collapsed position as shown at 26 (FIG. 2), the device 10 removed from the vessel through the vessel opening, and the waste materials removed using conventional means such as vacuum pumps, etc.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed is:

1. A device for removing material from a vessel, comprising:
    a chassis extending along a longitudinal axis;
    a first track member extending longitudinally on an underside of the chassis;
    a second track member extending longitudinally on the underside of the chassis, in transversely spaced relation to the first track member;
    an intrinsically safe drive system configured to drive the first and second track members;
    the intrinsically safe drive system being operable to drive the first and second track members independently of one another to provide forward, reverse and/or rotational movement of the device;
    a remotely controllable arm pivotably disposed at a proximal end thereof on the upper side of the chassis, the remotely controllable arm being pivotable between a collapsed position extending substantially parallel to the longitudinal axis, and an extended position extending obliquely or substantially orthogonally to the longitudinal axis;
    one or more nozzles rotatably disposed at a distal end of the remotely controllable arm;
    the one or more nozzles configured to rotate while spraying liquid in mutually opposed directions along a notional circumference extending about the distal end of the remotely controllable arm, wherein torque on the chassis generated by the spraying liquid is substantially offset;
    the device being sized and shaped to pass through an opening in a vessel, the opening having a transverse dimension as small as 24 inches, when the remotely controllable arm is disposed in the collapsed position;
    wherein the first and second track members and the remotely controllable arm are controllable remotely by a control system disposable externally to the vessel; and
    wherein once the device has passed through the opening into the vessel, the remotely controllable arm is movable into the extended position to place the plurality of nozzles in an elevated position within the vessel, and the first and/or second track members are drivable to move the device within the vessel while the nozzles spray liquid along the notional circumference to remove waste materials from an interior surface of the vessel.

2. The device of claim 1, further comprising an intrinsically safe actuator configured to move the remotely controllable arm between the collapsed and extended positions.

3. The device of claim 1, wherein the chassis is armored to withstand high pressure liquid impact on an upperside thereof at up to 60,000 psi.

4. The device of claim 3, wherein the chassis comprises an upperside armor plate and an armored skirt depending therefrom, the armored skirt extending along a periphery of the upperside armored plate.

5. The device of claim 3, wherein the nozzles are configured to rotate while spraying liquid at up to 60,000 psi in mutually opposed directions along a notional circumference extending 360 degrees about the distal end of the remotely controllable arm when the remotely controllable arm is disposed in the extended position, the notional circumference being disposed in a plane that intersects the chassis.

6. The device of claim 5, wherein the mutually opposed directions are spaced substantially uniformly from one another along said notional circumference.

7. The device of claim 6, wherein the mutually opposed directions are diametrically opposed to one another.

8. The device of claim 5, wherein the notional circumference is disposed in a plane that is substantially orthogonal to the longitudinal axis of the chassis.

9. The device of claim 5, wherein the liquid comprises water.

10. The device of claim 1, wherein the intrinsically safe drive system is configured to satisfy ANSI/UL 913 Edition 8.

11. The device of claim 10 wherein the intrinsically safe drive system comprises a pneumatic drive system.

12. The device of claim 11, wherein the pneumatic drive system comprises:
    a first pneumatic drive configured to drive the first track member; and
    a second pneumatic drive configured to drive the second track member.

13. The device of claim 12, wherein the first pneumatic drive is operable independently of the second pneumatic drive to provide forward, reverse and/or rotational movement of the device.

14. The device of claim 1, further comprising the controller operatively connected to the device and configured to control movement of the first and second track members and the remotely controllable arm.

15. The device of claim 1, wherein the device has a maximum transverse dimension of less 20 inches when the remotely controllable arm is disposed in the collapsed position.

16. A method for removing material from a vessel, comprising:
    passing the device of claim 1, with the remotely controllable arm in the collapsed position, through the opening of the vessel;
    with a controller disposed externally to the vessel, moving the remotely controllable arm into the extended position to place the nozzles in an elevated position within the vessel;
    supplying liquid to the nozzles rotatably disposed at a distal end of the remotely controllable arm, to spray liquid in mutually opposed directions along the notional circumference extending about the distal end of the remotely controllable arm, wherein torque on the chassis generated by the spraying liquid is substantially offset;
    with the control system disposed externally to the vessel, actuating the intrinsically safe drive system to drive the first and/or second track members to move the device within the vessel while the nozzles spray liquid along the notional circumference to remove waste materials from the interior surface of the vessel.

17. The method of claim 16, wherein the chassis is armored to withstand high pressure liquid impact on an upperside thereof at up to 60,000 psi.

18. The method of claim 17, further comprising spraying the liquid at up to 60,000 psi in mutually opposed directions along a notional circumference extending 360 degrees about the distal end of the remotely controllable arm when the remotely controllable arm is disposed in the extended position, the notional circumference being disposed in a plane that intersects the chassis.

19. The method of claim 18, wherein the mutually opposed directions are spaced substantially uniformly from one another along said notional circumference.

20. The method of claim 19, wherein the mutually opposed directions are diametrically opposed to one another.

21. The method of claim 18, wherein the liquid comprises water.

22. The method of claim 16, wherein the intrinsically safe drive system is configured to satisfy ANSI/UL 913 Edition 8.

23. The method of claim 22 wherein the intrinsically safe drive system comprises a pneumatic drive system.

24. The method of claim 16, wherein device has a maximum transverse dimension of less 20 inches when the remotely controllable arm is disposed in the collapsed position.

25. A device for removing material from a vessel, comprising:
    an armored chassis extending along a longitudinal axis, the armored chassis configured to withstand high pressure water impact on an upperside thereof at up to 60,000 psi;
    a first track member extending longitudinally on an underside of the armored chassis;
    a second track member extending longitudinally on the underside of the armored chassis, in transversely spaced relation to the first track member;
    a first pneumatic drive system configured to drive the first track member;
    a second pneumatic drive system configured to drive the second track member;
    the first pneumatic drive system being operable independently of the second pneumatic drive system to provide forward, reverse and/or rotational movement of the device;
    a remotely controllable arm pivotably disposed at a proximal end thereof on the upper side of the armored chassis, the remotely controllable arm being pivotable between a collapsed position extending substantially parallel to the longitudinal axis, and an extended position extending obliquely or substantially orthogonally to the longitudinal axis;
    a plurality of nozzles rotatably disposed at a distal end of the remotely controllable arm;
    the plurality of nozzles configured to rotate while spraying liquid at up to 60,000 psi in mutually opposed directions along a notional circumference extending 360 degrees about the armored chassis when the remotely controllable arm is disposed in the extended position, the notional circumference disposed in a plane that is substantially orthogonal to the longitudinal axis;
    the device being sized and shaped to pass through a 24-inch opening in the vessel when the remotely controllable arm is disposed in the collapsed position;
    wherein the first and second track members and the remotely controllable arm are controllable remotely by an operator external to the vessel; and
    wherein once the device has passed through the 24-inch opening into the vessel, the remotely controllable arm is movable into the extended position to place the plurality of nozzles in an elevated position within the vessel, and the device is movable within the vessel while the nozzles spray liquid along the notional circumference to remove waste materials from an interior surface of the vessel.

\* \* \* \* \*